United States Patent [19]
Gill et al.

[11] 3,919,033
[45] Nov. 11, 1975

[54] FABRIC BONDING PROCESS UTILIZING POWDERED INTERPOLYAMIDES

[75] Inventors: Wendy Rawstron Gill; John Norbury, both of Manchester, England

[73] Assignee: Imperial Chemical Industries Limited, London, England

[22] Filed: May 1, 1973

[21] Appl. No.: 356,170

Related U.S. Application Data

[62] Division of Ser. No. 119,610, March 1, 1971, abandoned.

[30] Foreign Application Priority Data

Mar. 12, 1970 United Kingdom............ 11931/70

[52] U.S. Cl............. 156/283; 156/331; 260/78 A; 428/474
[51] Int. Cl.².... C09J 5/06; B32B 27/34; B32B 5/30
[58] Field of Search........ 117/161 P; 156/276, 283, 156/331; 161/87, 158, 227; 260/78 A

[56] References Cited
UNITED STATES PATENTS

| | | | |
|---|---|---|---|
| 2,252,554 | 8/1941 | Carothers | 260/78 A |
| 2,252,555 | 8/1941 | Carothers | 260/78 A |
| 2,285,009 | 6/1942 | Brubaker et al. | 260/78 A |
| 2,293,760 | 8/1942 | Peters | 260/78 A X |
| 3,448,087 | 6/1969 | Ballentine et al. | 260/78 A |
| 3,583,949 | 6/1971 | Simons | 260/78 A |
| 3,669,917 | 6/1972 | Ando et al. | 260/78 R |
| 3,674,593 | 7/1972 | Pearson et al. | 156/276 |

OTHER PUBLICATIONS

Chem. Abstracts, Vol. 50, 1956, 7060i–7061a–b, Korshak et al.
Chem. Abstracts, Vol. 51, 1957, 12535d–f, Kargin et al.
Chem. Abstracts, Vol. 54, 1960, 17947i–17948a, Frunze et al.
Chem. Abstracts, Vol. 61, 1964, 16173g–h, 16174a, Pavlov et al.

*Primary Examiner*—William A. Powell
*Assistant Examiner*—Robert A. Dawson
*Attorney, Agent, or Firm*—Cushman, Darby & Cushman

[57] ABSTRACT

Bonding fabrics, using as a fusible adhesive a polyamide consisting essentially of hexamethyleneazeleamide units, ε-aminocaproic acid units and optionally hexamethylene adipamide units randomly distributed, the proportions of the units being such that the softening point range (by ball and ring technique) is 120° to 160°C.

3 Claims, 1 Drawing Figure

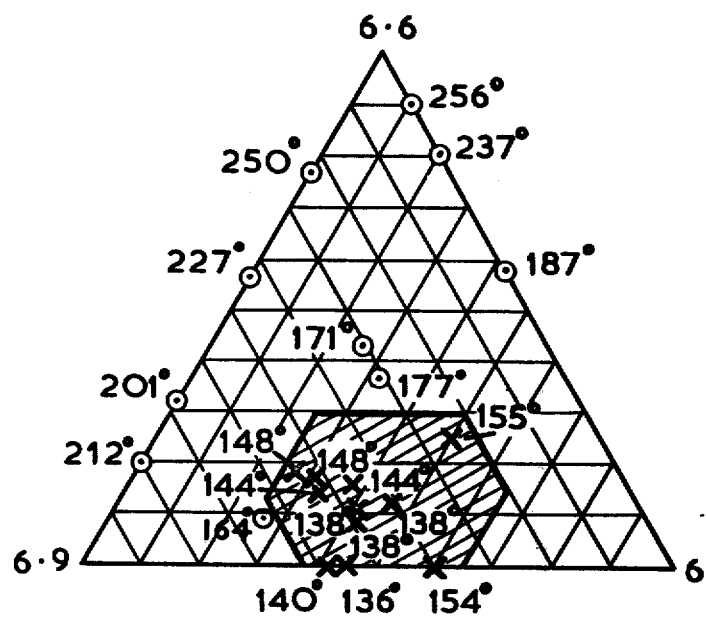

FABRIC BONDING PROCESS UTILIZING POWDERED INTERPOLYAMIDES

This is a division of application Ser. No. 119,610, filed Mar. 1, 1971, and now abandoned.

This invention relates to a fabric-bonding process, to a solid adhesive suitable for use in the process, and to fusible interlinings.

It is well-known to use thermoplastic materials as adhesives for bonding fabrics by the application of heat or heat and pressure. Thus for example stiffening materials for interlinings which can be ironed on to textile materials usually consist of a woven or non-woven fabric carrying a thermoplastic material on at least one surface. Such stiffening materials are known in the art as "fusible interlinings." Labels and repair fabrics carrying a thermoplastic material can also be applied by "iron-on" techniques.

Although polyamides have been used as thermoplastic materials for application to fabrics they are usually too high melting unless used in conjunction with a plasticiser, which then becomes a source of weakness in the bond since it is dissolved out by cleaning processes. Certain interpolyamides of relatively low melting point have been used, but these suffer the disadvantages of high cost and low resistance to water.

According to the invention a fabric-bonding process comprises applying to a fabric surface a polyamide consisting essentially of hexamethyleneazeleamide units, ε-aminocaproic acid units, and optionally hexamethyleneadipamide units randomly distributed, the proportions of the units being such that the softening point range of the polyamide determined by the ball and ring technique using an oil bath heating rate of 4° to 5°C per minute is between 120° and 160°C, bringing said surface into contact with a second fabric surface and applying heat to soften the polyamide. The ball and ring technique for determining softening points is described in ASTM E 28-67.

Interpolyamides suitable for use in the process of the invention are designated nylon 6.9/6 or, if they contain hexamethyleneadipamide units, nylon 6.9/6/6.6. They may conveniently be made by copolymerisation of hexamethylenediammonium azeleate (6.9 salt), caprolactum or ε-aminocaproic acid or both and optionally hexamethylenediammonium adipate (6.6 salt) in the desired proportions. If desired the polyamides may also be made from mixtures of hexamethylenediamine with azelaic acid and caprolactam and optionally adipic acid or from low molecular weight polymers or interpolymers from these starting materials. When the proportions of the monomers are appropriately chosen complete condensation results in polyamides having softening point ranges within the stated limits, and it is not necessary to limit the molecular weight of the polyamides.

Although preferably the polyamides are such as can be made entirely from hexamethylene diamine, azelaic acid, caprolactam and optionally adipic acid, the use of polyamides which can be made from mixtures containing small proportions of other diamines and/or dibasic acids is not excluded from the invention. Thus for example the polyamides may contain up to 10% of other amide units. In particular the polyamide may be made from mixtures containing small proportions of diamines such as ethylene diamine, trimethylene diamine, tetramethylene diamine, pentamethylene diamine, decamethylene diamine, dodecanomethylene diamine or of dibasic acids such as oxalic, succinic, adipic, suberic, sebacic, dodecandoic, terephthalic or isophthalic acids.

In the accompanying drawing, which is a triangular plot of the percentages by weight of the three amide units in 100% nylon 6.9/6/6.6 the points marked by crosses indicate particular polyamides which have ball and ring softening points within these ranges and the shaded area embraces such polyamides. Those points marked by circles indicate particular polyamides which have softening points outside the said ranges. This shaded area includes certain compositions in which the proportion of 6.6 units is zero, and it is therefore a graphic representation of those nylons 6.9/6 and 6.9/6/6.6 which may be used in the fabric bonding process of the invention. The limits of the shaded area are

| | | |
|---|---|---|
| hexamethylene azeleamide | (6.9) units | 20-62% by weight |
| aminocaproic acid | (6) units | 25-65% by weight |
| hexamethylene adipamide | (6.6) units | 0-30% by weight |

Polyamides incorporating small amounts of other diamines and/or acids may have ball and ring softening point ranges lower than those possessed by the corresponding polyamides which do not incorporate such other diamines and/or acids.

In the process of the invention the polyamides may be applied to the fabric surface by known techniques for example in the form of a solution or dispersion in a volatile solvent or preferably in the form of a powder. Plasticisers can be used if desired but in view of the low softening point range of the polyamides their use is unnecessary.

According to a further feature of the invention an adhesive suitable for bonding fabrics by the application of heat comprises a polyamide consisting essentially of hexamethylene azelamide units, caprolactam units and optionally hexamethylene adipamide units randomly distributed, the proportion of the units being such that the softening point range of the polyamide as determined by a ball and ring technique using an oil bath heating rate of 4° to 5° per minute is between 120° and 160°C and said polyamide being in the form of a finely divided powder, preferably of number average particle size less than 300μ, especially 100 to 300μ.

More particularly the adhesives of the invention may be polyamides consisting wholly of hexamethyleneazelamide units, caprolactam units and optionally hexamethylene adipamide units, all in proportions within the shaded area in the accompanying drawing.

The adhesives in powder form may be made from bulk polymer by atomisation of a melt, extrusion followed by breaking up the extrudate, or by precipitation from solution in a solvent, for example sulphuric or formic acid or dimethyl formamide, or preferably by grinding chip material. The polyamides are amenable to grinding, particularly freeze grinding i.e. grinding at low temperature, for instance in presence of liquid nitrogen, and this is an added reason for their suitability for use in fabric bonding. Advantageously an antistatic agent may be present during grinding, and if desired may remain in the powdered adhesive.

The step of softening the polyamide by the application of heat can be carried out by ironing or other hot pressing techniques. Thus the invention in one of its embodiments provides improved interlinings for fabrics.

Accordingly a further feature of the invention provides a fusible interlining comprising fabric carrying on at least one of its surfaces a polyamide consisting essentially of hexamethylene azeleamide units, caprolactam units and optionally hexamethylene adipamide units randomly distributed, the proportion of the units being such that the softening point range of the polyamide as determined by a ball and ring technique using an oil bath heating rate of 4° to 5° per minute is between 120° and 160°C.

More particularly the invention provides a fusible interlining comprising fabric carrying on at least one of its surfaces a polyamide consisting wholly of hexamethyleneazeleamide units, caprolactam units and optionally hexamethyleneadipamide units, all in proportion within the shaded area in the accompanying drawing.

Fusible interlinings of the invention produce strong bonds with other fabrics by softening of the interpolyamide, and the bonds are resistant to the action of dry cleaning solvents, and of soap and detergents.

The invention is illustrated but not limited by the following Examples in which the parts are by weight:

EXAMPLE 1

A terpolyamide designated 69/6/66 51.9/32.8/15.3 w/w (based on polymer) molar ratio was prepared by copolymerising 3,040 parts of hexamethylene diammonium azeleate, 1,695 parts caprolactam and 917 parts hexamethylene diammonium adipate in a stainless steel autoclave, using a conventional nylon polymerisation process. The resulting polymer had a melting point, measured by Vicat penetrometer, of 134°–160°C, and melting point measured by ball and ring technique of 146°C and a relative viscosity of 32.6 (8.4% solution in 90% formic acid at 25°C). The polymer chip was ground by milling to a powder of number average particle size less than 300μ, applied to cotton base cloth at a loading of one ounce per square yard, and fused to a cotton material with a hand iron set so that the temperature at the interlining was approximately 150°C. One inch wide strips of this bonded material were used to test the resistance of the bond to washing in soap and detergent solutions and dry cleaning in trichloroethylene. Peel strengths were determined on a tensometer at a separation rate of 2 inches per minute.

Results are given in the Table.

EXAMPLE 2

A terpolymer designated 6.9/6/6.6 49.3/41.5/9.2 w/w (based on polymer) molar ratio was prepared by copolymerising 2,736 parts of hexamethylene diammonium azeleate, 2,034 parts caprolactam and 524 parts hexamethylene diammonium adipate, in a stainless steel autoclave, using a conventional nylon polymerisation process. The resulting polymer had a melting point, measured by Vicat penetrometer, of 133°–145°C, and melting point measured by ball and ring technique of 153°C and a relative viscosity of 43 (8.4% solution in formic acid at 25°C). The polymer chip was ground by milling to a powder of number average particle size less than 300μ, applied to cotton base cloth at a loading of one ounce per square yard, and fused to a cotton material with a hand iron set so that the temperature at the interlining was 150°–155°C. This bonded material was measured for washing and dry cleaning resistance as indicated in Example 1.

Results are given in the Table.

EXAMPLE 3

A terpolyamide designated 6.9/6/6.6 53/27.6/19.4 w/w (based on polymer) was prepared by copolymerising 2,857 parts of hexamethylene diammonium azeleate, 1,490 parts of caprolactam, and 1,048 parts of hexamethylene diammonium adipate in a stainless steel autoclave, using a conventional nylon polymerisation process. The resulting polymer had a melting point measured by Vicat penetrometer of 151°–161°C and melting point measured by ball and ring technique of 148°C and a relative viscosity of 22.4 (8.4% solution in 90% formic acid at 25°C). The polymer chip was ground by milling to a powder of number average particle size less than 300μ, applied to cotton base cloth at a loading of one ounce per square yard, and fused to a cotton material with a hand iron set so that the temperature at the interlining was 150°–155°C. 1 inch wide strips of this bonded material were used to test the resistance of the bond to washing in soap and detergent solutions and dry cleaning in trichloroethylene. Peel strengths were determined on a tensometer at a separation rate of 2 inches/minute.

Test results are given in the Table.

EXAMPLE 4

A terpolyamide designated 6.9/6/6.6 25/50/25 w/w (based on polymer) was prepared by copolymerising 1,250 parts of hexamethylene diammonium aceleate, 2,500 parts of caprolactam and 1,250 parts of hexamethylene diammonium adipate in a stainless steel autoclave, using a conventional nylon polymerisation process. The resulting polymer had a melting point measured by Vicat penetrometer of 145°–157°C, and melting point measured by ball and ring of 155°C and a relative viscosity of 21.3 (8.4% solution in 90% formic acid at 25°C). After finely grinding this product was suitable for use as a fusible adhesive for textiles, giving bonds of very good strength.

EXAMPLE 5

A polyamide designated 6.9/6/6.6/6.12 50.4/28.2/15.1/6.3 w/w (based on polymer) was prepared by copolymerising 2,754 parts of hexamethylene diammonium azeleate, 1,532 parts of caprolactam, 828 parts of hexamethylene diammonium adipate and 346 parts of hexamethylene diammonium dodecanedioate in a stainless steel autoclave, using a conventional nylon polymerisation process. The resulting polymer had a melting point measured by Vicat penetrometer of 141°–147°C and a ball and ring melting point of 145°C and a relative viscosity of 26.3. The polymer chip was ground by milling to a powder of number average particle size less than 300μ. Application to base cloth, fusing and testing were carried out as in Example 1.

Test results are given in the Table.

EXAMPLE 6

A polyamide designated 6.9/6/6.6 49.5/40.5/10 w/w (based on polymer) was prepared by copolymerising 2,751 parts of hexamethylene diammonium azeleate, 1,989 parts of caprolactam, 566 parts of hexamethylene diammonium adipate in a stainless steel autoclave, using a conventional nylon polymerisation process. The resulting polymer had a melting point measured by Vicat penetrometer of 132°–141°C, and a melting point measured by ball and ring technique of 138°C, and a relative viscosity of 28.6 (8.4% solution in 90% formic acid at 25°C). After finely grinding this product was suitable for use as a fusible adhesive for textiles, giving bonds of very good strength.

EXAMPLE 7

A polyamide designated 6.9/6/6.6 46.7/38.3/15 w/w (based on polymer) was prepared by copolymerising 2,584 parts of hexamethylene diammonium azeleate, 1,872 parts of caprolactam, 844 parts of hexamethylene diammonium adipate in a stainless steel autoclave, using a conventional nylon polymerisation process. The resulting polymer had a melting point measured by Vicat penetrometer of 133°–138°C and a melting point measured by ball and ring technique of 143°C and a relative viscosity of 33.9 (8.4% solution in 90% formic acid at 25°C). After finely grinding, this product was suitable for use as a fusible adhesive for textiles, giving bonds of very good strength.

EXAMPLE 8

A polyamide designated nylon 6.9/6 55/45 w/w (based on polymer) was prepared by copolymerising 3,089 parts of hexamethylene diammonium azeleate with 2,224 parts of caprolactam in a stainless steel autoclave using a conventional nylon polymerisation process. The resulting polymer had a melting point measured by Vicat penetrometer, of 134°–139°C, and a melting point measured by ball and ring technique of 136°C and a relative viscosity of 26.3 (8.4% solution in 90% formic acid at 25°C). The polymer chip was ground by milling to a powder of number average particle size less than 300μ. Application to base cloth, fusing and testing were carried out as in Example 1.

Test results are given in the Table.

Table

| Treatment after Bonding | | PEEL STRENGTH (LB/IN) | | | | |
|---|---|---|---|---|---|---|
| | | Ex.1 | Ex.2 | Ex.3 | Ex.5 | Ex.8 |
| None | | * | * | * | 8 | 9 |
| Immersion in 1% soap solution at 60°C for 16 hours. | Wet | 5.5 | 4 | 6.1 | 7 | 5.7 |
| | Dry | 8 | 6 | 8 | 7 | 8 |
| Immersion in 10% detergent solution at 60°C for 2 hours | Wet | 8 | 4 | 6.8 | 4 | 5.6 |
| | Dry | 8 | 7 | 8.2 | 6.4 | 6.8 |
| Immersion in trichloroethylene at 45°C for 3 hours | Wet | * | 7 | 7.5 | 7 | 7.4 |
| | Dry | * | 8 | 8 | 8.5 | 8.2 |

*Fabric disintegrated before bond broken.

We claim:
1. A fabric bonding process comprising applying to a fabric surface an interpolyamide in the form of a finely divided powder consisting essentially of hexamethyleneazeleamide units in a proportion of 20–62% by weight, ε-amino-caproic acid units in a proportion of 25–65% by weight and hexamethylene adipamide units in a proportion of 0–30% by weight, the proportion of the units being such that the softening point range of the polyamide determined by the ball and ring technique using an oil bath heating rate of 4° to 5°C per minute is between 120° and 160°C, bringing said surface into contact with a second fabric surface and applying heat to soften the polyamide.
2. A fabric bonding process according to claim 1 wherein the interpolyamide is in the form of a finely divided powder having a number average particle size less than 300μ.
3. A fabric bonding process according to claim 2 wherein the number average particle size is in the range of 100 to 300μ.

* * * * *